United States Patent
Iwamoto et al.

(10) Patent No.: US 6,772,834 B2
(45) Date of Patent: Aug. 10, 2004

(54) AIR CONDITIONING SYSTEM FOR VEHICLE

(75) Inventors: Kenji Iwamoto, Kariya (JP); Yoshihisa Shimada, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/861,372

(22) Filed: May 18, 2001

(65) Prior Publication Data

US 2001/0045278 A1 Nov. 29, 2001

(30) Foreign Application Priority Data

May 19, 2000 (JP) ........................................ 2000-148458

(51) Int. Cl.[7] .................................................. B60H 1/00
(52) U.S. Cl. ...................... 165/271; 165/202; 165/203; 165/42; 454/75
(58) Field of Search ............................ 165/42, 44, 202, 165/203, 271; 62/244; 454/75

(56) References Cited

U.S. PATENT DOCUMENTS

| | | | |
|---|---|---|---|
| 4,694,798 A | * | 9/1987 | Kato et al. .............. 165/271 X |
| 5,003,785 A | * | 4/1991 | Petri et al. ................. 62/244 X |
| 5,117,643 A | * | 6/1992 | Sakurai et al. .......... 165/271 X |
| 5,259,814 A | * | 11/1993 | Weissbrich et al. ........... 454/75 |
| 5,509,852 A | * | 4/1996 | Clark .......................... 454/75 |
| 5,518,176 A | * | 5/1996 | Turner et al. |
| 5,929,534 A | * | 7/1999 | Pickett |
| 6,206,084 B1 | * | 3/2001 | Wiezt ..................... 165/271 X |
| 6,213,865 B1 | * | 4/2001 | Odebrecht ................ 165/44 X |
| 6,261,173 B1 | * | 7/2001 | Odebrecht ................ 165/44 X |
| 6,269,872 B1 | * | 8/2001 | Anderson .................... 165/271 |

FOREIGN PATENT DOCUMENTS

| JP | A-63-41226 | 2/1988 |
|---|---|---|
| JP | A-5-038926 | 2/1993 |

* cited by examiner

Primary Examiner—Ljiljana Ciric
(74) Attorney, Agent, or Firm—Harness, Dickey & Pierce, PLC

(57) ABSTRACT

In an air conditioning system mounted on a vehicle whose roof is openable and closable, adjustment of the air volume from the blower is made based on whether the roof is open or closed. When it is determined that the roof is open, the air volume from the blower is increased according to an increase in a vehicle speed. As such, when the vehicle speed is increased, and airflow entrapped from rearward to frontward becomes strong while the roof is open, adjustment to the air volume is made.

3 Claims, 4 Drawing Sheets

AIR CONDITIONING SYSTEM FOR VEHICLE

CROSS-REFERENCE TO RELATED APPLICATION

The present invention is related to Japanese patent application No. 2000-148458, filed May 19, 2000; the contents of which are incorporated herein by reference.

FIELD OF THE INVENTION

The present invention relates to air volume control for an air conditioning system, and more particularly, to an air volume control for a vehicle with a convertible top.

DESCRIPTION OF RELATED ART

Conventionally, in JP-A No. S63-41226, an air volume control in an air conditioning system for an open car is proposed. In this conventional art, when the car speed is increased during traveling with the vehicle roof open, the blowout air volume within a vehicle compartment is reduced. Air flowing around an occupant in an open roof car flows obliquely upward and rearward along an inclination of the vehicle wind shield and is a turbulent flow being entangled from forward to rearward of the vehicle. This entangling or entrapped air becomes stronger with vehicle speed.

However, in the conventional art described above, since the blowout air volume to the inside of a vehicle compartment is decreased during high speed traveling, an occupant is uncomfortable when exposed to the high temperature and strong entangling air during high speed traveling in hot summer. Also, the occupant is uncomfortable when exposed to the entangling air during the cold low temperatures of winter.

SUMMARY OF THE INVENTION

In view of the these and other drawbacks, the present invention provides a blowing means (4) for blowing air to inside a vehicle compartment, heat exchanging means (11, 13) for exchanging heat with air blown by the blowing means (4), a determining means (S52) for determining an opening/closing state of a roof (40), and air volume control means (S51, S53, S54, S55) for increasing air volume of the blowing means (4) according to an increase in a vehicle speed.

Accordingly, when the roof (40) is open, even if an airflow is entrapped from rearward to forward in the vehicle due to an increase in vehicle speed, poor air conditioning feeling due to entrapped air can be restrained by increasing blowout air volume.

In another aspect, a computing means (S4) for computing a target temperature (TAO) of air blown inside a vehicle compartment, wherein an air volume control means includes a reference air volume determining means (S51) for determining reference air volume based on a target temperature (TAO), and a correction air volume determining means (S53 S55) for determining correction air volume relative to the reference air volume in response to an increase in a vehicle speed when the determining means S52 has determined that the roof (40) is open. Accordingly, blowout air volume can be determined by correcting reference air volume determined based on the target temperature (TAO) according to the vehicle speed.

In another aspect, a determining temperature of an outside air temperature (Tam) is set as a first prescribed temperature (T1) for determining the lower limit of a range of the outside air temperature during spring or fall, such as spring or autumn, a second predetermined temperature (T2) for determining the upper limit of the outside air temperature range during spring or fall, wherein a determining means (S52) has determined that the roof (40) is open, and increasing air volume of a blowing means (4) according to an increase in vehicle speed when the outside air temperature (Tam)<a first prescribed temperature (T1), and when the outside air temperature (Tam)>a second prescribed temperature (T2).

In an intermediate temperature area during spring or autumn, since the outside air temperature is comfortable, the poor air conditioning feeling due to entrapped air is slight. Thus, a correction of air volume according to the vehicle speed is conducted only during low outside air temperature (Tam<T1) and high outside air temperature (Tam>T2) when the roof (40) is open. The correction of the air volume is not conducted according to the vehicle speed when the outside air temperature is in an intermediate temperature area (in range of T1–T2).

Only when the roof is opened during low and high outside air temperature, the air volume correction according to the vehicle speed is conducted to inhibit worsening of the air conditioning feeling. On the other hand, in an intermediate temperature area during spring and autumn, the correction of the air volume according to the vehicle speed is prohibited to stop unnecessarily increasing blowout air volume.

In another aspect, a blowing means (4) for blowing air toward inside a vehicle compartment, heat exchanging means (11, 13) for exchanging heat thereof with blowing air of the blowing means (4), a determining means (S52) for determining an opening/closing state of a roof (40), and air volume control means (S51, S53, S54, S55) for controlling air volume of the blowing means (4) is provided. As the determining temperature of the outside air temperature (Tam), a first prescribed temperature (T1) for determining the lower limit in a range of outside air temperatures during spring or fall, and a second prescribed temperature (T2) for determining the upper limit in a range of the outside air temperatures during spring or fall are set. Wherein, the determining means (S52) has determined the roof (40) is open. Further, when the outside air temperature (Tam)<the first prescribed temperature (T1), and the outside air temperature (Tam)>the second prescribed temperature (T2), the air volume of the blowing means (4) is increased.

Only when the roof is opened during low outside air temperature and a high outside air temperature is an increase in air volume is conducted to inhibit worsening the air conditioning feeling. On the other hand, in an intermediate temperature area of spring and autumn, air volume correction is prohibited, and unnecessary air blowout increase is stopped.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

Hereinafter, an embodiment of the invention will be explained based on the drawings.

Figure 1:
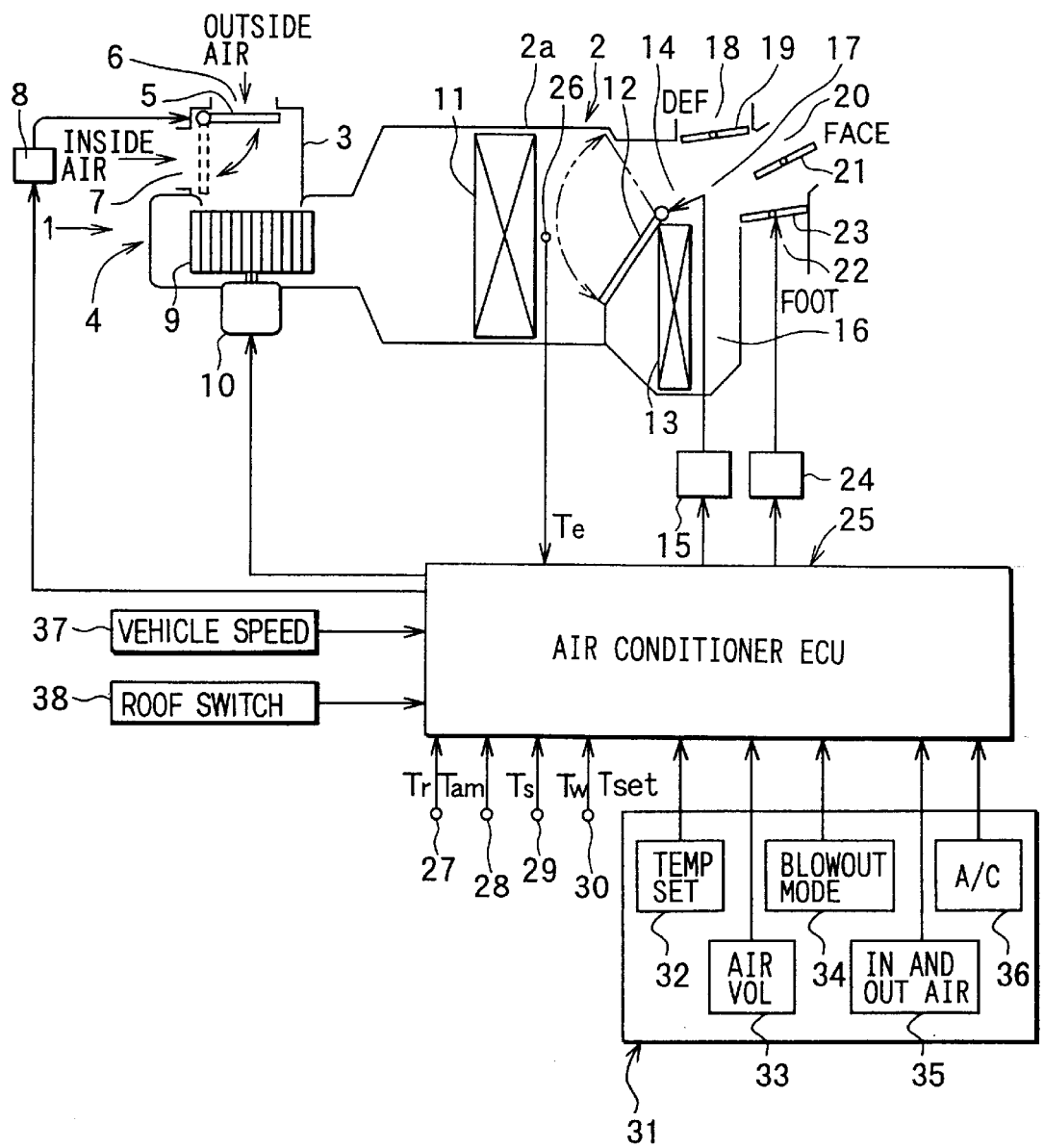
FIG. 1 is a schematic view of an air conditioning system according to the invention.

FIG. 1 is a schematic view illustrating an air conditioning system for a vehicle according to an embodiment of the invention. A unit section inside the vehicle compartment of the air conditioning system for a vehicle has a blowing unit 1 divided into two sections and an air conditioning unit 2. The air conditioning unit 2 is normally arranged in a center position widthwise of the vehicle inside an instrument panel. The blowing unit 1 is offset to the side of a front passenger seat relative to the air conditioning unit 2.

The blowing unit 1 includes an inside air/outside air switching box 3 and a blower 4. The blowing unit 1 opens/closes an outside air introducing port 6 and an inside air introducing port 7 with an inside air/outside air switching door 5. Thereby, the outside air (air outside the vehicle compartment) and the inside air (air inside the vehicle compartment) is switched and introduced inside the inside air/outside air switching box 3. The inside air/outside air switching door 5 is driven by an electrical drive device 8 having a servomotor. A centrifugal blowing fan 9 and a driving motor 10 are provided in the blower 4.

The air conditioning unit 2 is provided with an air conditioning case 2a that forms an air passage, an evaporator (heat exchange means for cooling) 11 of a refrigerating cycle is arranged upstream in air conditioning case 2a, and an air mix door 12 is arranged downstream of the evaporator 11. Downstream of the air mix door 12, a hot water type heater core (heat exchange means for heating) 13 for heating air with hot water (cooling water) from a vehicle engine as a heat source is installed. On the side of the hot water heater core 13, a bypass passage 14 for bypassing air by the hot water type heater core 13 is formed.

The air mix door 12 is a rotatable plate shaped door, and is driven by an electric drive device 15 having a servomotor. The air mix door 12 adjusts an air volume ratio of hot air passing through a hot water type heater core 13 and cooling air passing through the bypass passage 14. A blowout air temperature of air into the vehicle compartment is adjusted by adjusting the air volume ratio of cooling air and hot air. Accordingly, in the embodiment, a temperature adjusting means of blowout air inside the vehicle compartment is constituted by the air mix door 12.

Downstream of the hot water type heater core 13, a hot air passage 16 extending from a lower side to an upward direction is formed. Hot air from the hot air passage 16 and cold air from the bypass passage 14 are mixed in an air mixing section 17, and air with a desired temperature is produced. Further, inside the air conditioning case 2a, a blowout mode switching section is positioned downstream of the air mixing section 17. That is, at an upper surface section of the air conditioning case 2a, a defroster opening section 18 is formed. The defroster opening section 18 blows air to the inner surface of the windshield via a defroster duct not illustrated. The defroster opening section 18 is opened/closed by a defroster door 19 shaped as a freely rotatable plate.

Further, a face opening section 20 is formed in the upper surface section of the air conditioning case 2a and, rearward from the defroster opening section 18, the face opening section 20 blows air toward an upper half of an occupant inside the vehicle compartment via a face duct. The face opening section 20 is opened/closed by a face door 21 shaped as a freely rotatable plate.

Further, in air conditioning case 2a, a foot opening section 22 is formed on a lower side of the face opening section 20, and from the foot opening section 22, air is blown at an occupant's feet inside the vehicle compartment. The foot opening section 22 is opened/closed by a foot door 23 shaped as a freely rotatable plate. The blowout mode doors 19, 21, and 23 described above are connected to a common link mechanism (not illustrated), and are driven by an electric drive device 24 having a servomotor via the link mechanism.

Next, an outline of an electric control section in the embodiment will be explained. An electronic control device 25 for air conditioning has a well known microcomputer including a CPU, a ROM, a RAM, and the like, and their peripheral circuits. The evaporator 11 has a temperature sensor 26 that includes a thermistor as a temperature sensor. The temperature sensor 26 is arranged inside the air conditioning case 2a directly after air exits evaporator 11. The sensor 26 detects evaporator blowout temperature Te.

To the electronic control device 25, detection signals from other than the temperature sensor 26 described above, from sensors 27–30 for detecting inside air temperature Tr, an outside air temperature Tam, solar radiation Ts, hot water temperature Tw, and the like are input. Further, an air conditioning control panel 31 installed in an instrument panel inside the vehicle compartment is provided with operating switches 32–36, Operating signals from the operating switches 32–36 are input to the electronic control device 25 for the air conditioning. A temperature setting switch 32 generates a temperature setting signal Tset, an air volume switch 33 generates an air volume switching signal, a blowout mode switch 34 generates a blowout mode signal, an inside air/outside air changeover switch 35 generates an inside air/outside air switching signal, an air conditioning switch 36 interrupts compressor operation of a refrigerating cycle, and the like.

Figure 2A:
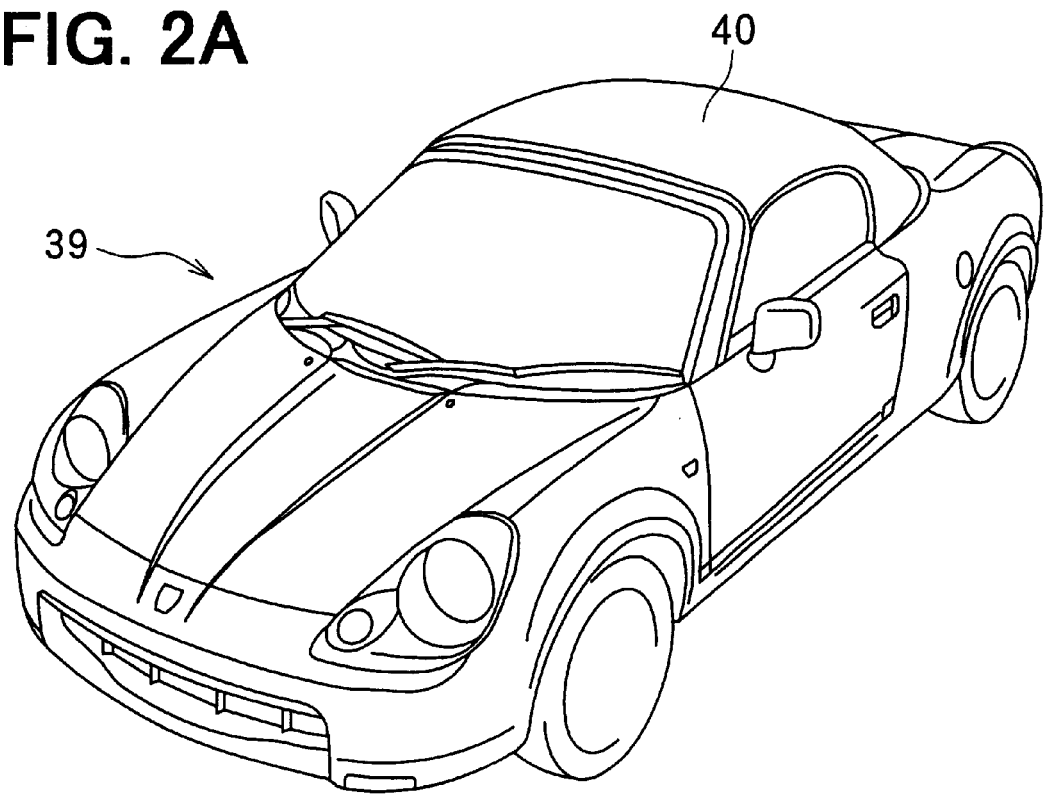
FIG. 2A is a perspective view of a vehicle using an air conditioning system according to the invention.
Figure 2B:
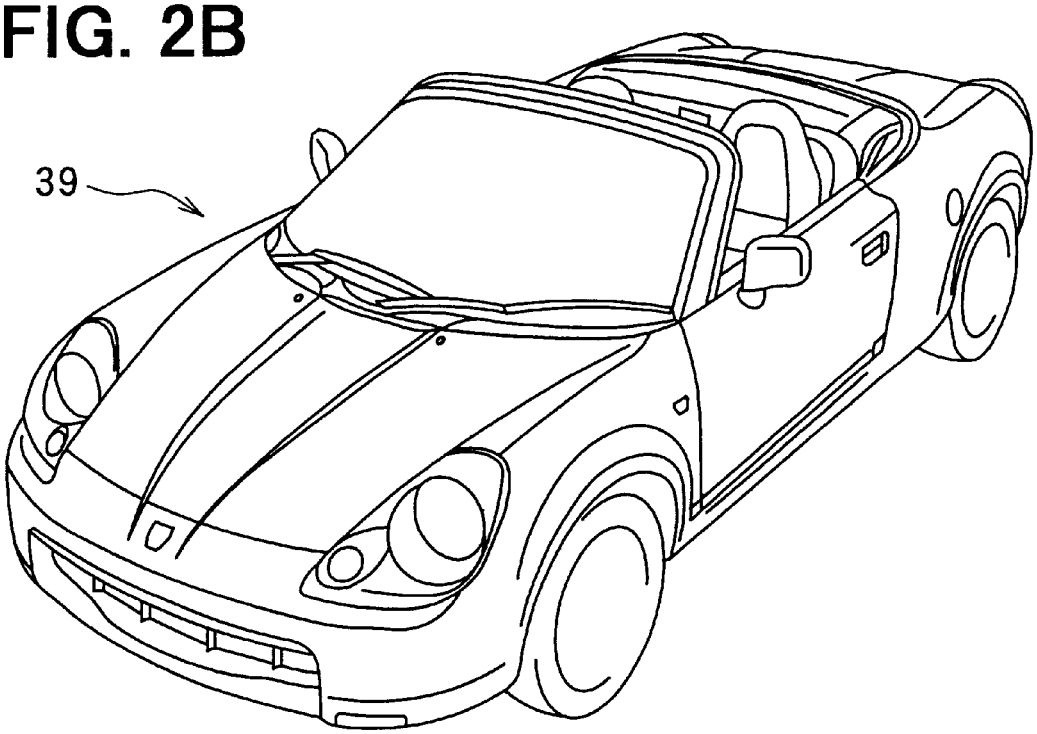
FIG. 2B is a perspective view of a vehicle using an air conditioning system according to the invention.

Further, detection signals from a vehicle speed sensor 37 and a roof switch 36 are input to the electronic control device for the air conditioning. Here, a vehicle 39 illustrated in FIG. 2 is a vehicle on which roof 40 is openable/closable. FIG. 2A illustrates a closed (full closed) state of the roof 40, and FIG. 2B illustrates an open (full open) state with the roof 40 stored inside a storage space in the rear section of the vehicle. The roof 40 can be positioned at a half open state or an intermediate position.

The roof switch 38 opens or closes the roof 40 as illustrated above in response to the roof position. In this embodiment, when the roof 40 is fully opened, the roof switch 38 goes to a closed state, and in the closed state and a half open state, the roof switch 38 is devised to be open.

Figure 3:
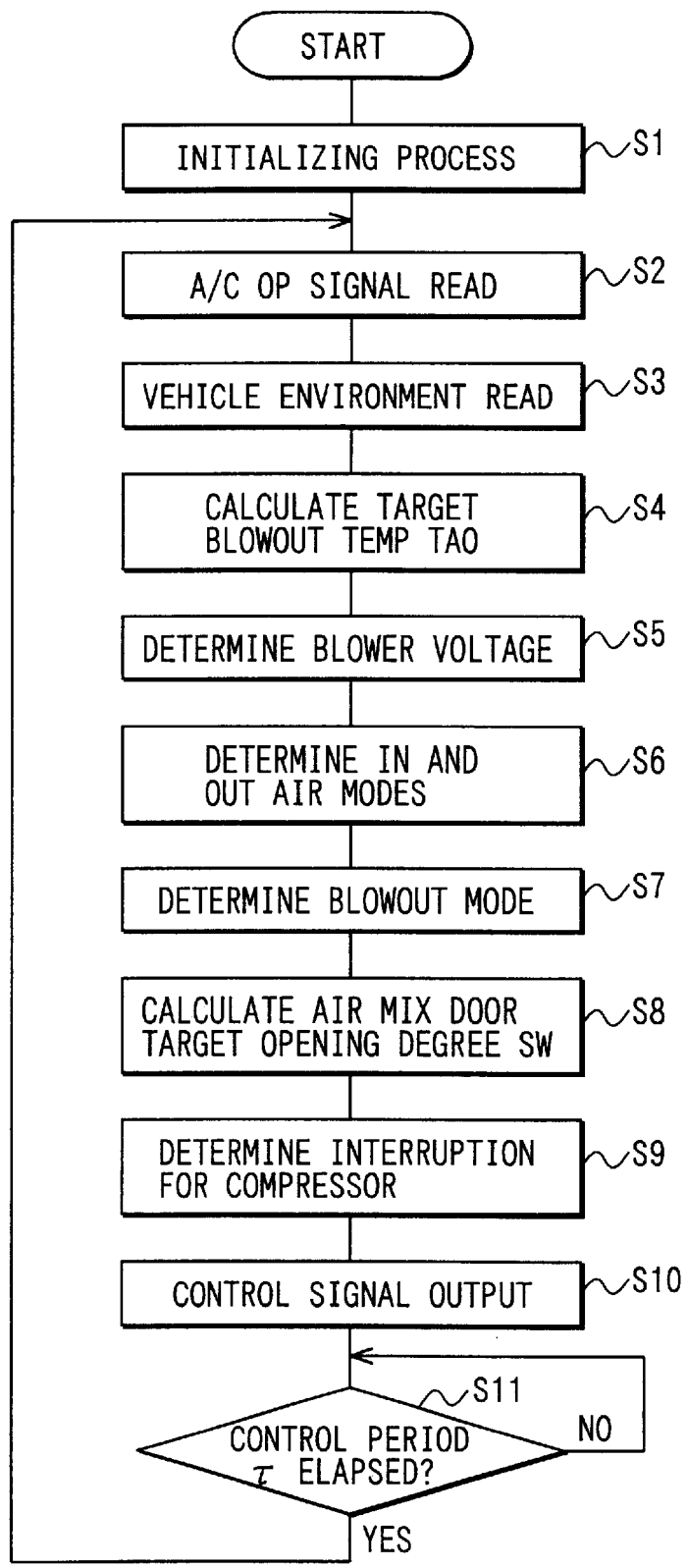
FIG. 3 is a flow chart illustrating the control according to the invention.

Next, the invention is explained. The flow chart in FIG. 3 illustrates an outline of control processing executed by a microcomputer of the electronic control device 25 for air conditioning. A control routine illustrated in FIG. 3 begins when an ignition switch of a vehicular engine is turned on and power is provided to the control device 25. In step S1, a flag, a timer, and the like are initialized. In the next step S2, operation signals from operation switches 32–36 of the air conditioning control panel 31 are read in. In step S3, a signal from an environment state of a vehicle, that is, the detection signals from the sensor 26–30, signals from a vehicle speed sensor 37 and a roof switch 38 are read in.

Subsequently, in a step S4, a target blowout temperature TAO of air conditioning air blown inside a vehicle compartment is calculated. The target blowout temperature TAO is a blowout temperature required for maintaining a set temperature Tset of a temperature set switch 32 inside a vehicle compartment, and is calculated based on a equation 1 described below.

$$TAO = Kset \times Tset - Kr \times Tr - Kam \times Tam - Ks \times Ts + C \qquad \text{[Equation 1]}$$

Where, Tr designates an inside air temperature detected by an inside air sensor 27, Tam designates an outside air temperature detected by an outside air sensor 28, Ts designates an amount of solar radiation detected by a solar radiation sensor 29, Kset, Kr, Kam, and Ks respectively designates a control gain, C designates a constant for a correction.

Next, in a step S5, a target blowing amount of air blown by a blower 4, specifically, a blower voltage level being an impression voltage of a blower driving motor 10, is determined based on the TAO described above. A specific determining method of the blower voltage level will be described hereinafter with reference to FIG. 4. Next, in step S6, an inside or outside air mode is determined. The inside air/outside air mode, for example, is determined to be the inside air mode when an inside air temperature Tr is considerably high (during high load cooling) relative to a set temperature Tset by an amount equal to or more than a prescribed temperature. The TAO described above may well be switched and set as the entire inside air mode→an inside air/outside air mixing mode→the entire outside air mode, according to an increase in the TAO described above, from a low temperature side to a high temperature side.

Next, in a step S7, a blowout mode is determined in response to the TAO described above. The blowout mode, as is well known, is switched and set as a face mode→a bi-level mode→a foot mode according to an increase in TAO from the low temperature side to the high temperature side. Next, in a step S8, a target opening degree SW is calculated according to the following equation 2 based on the TAO described above, an evaporator blowout temperature Te, and a hot water temperature Tw.

$$SW = [(TAO - Te)/(Tw - Te)] \times 100(\%) \qquad \text{[Equation 2]}$$

Here, the target opening degree SW of the air mix door 12 is expressed by a percentage by setting the maximum cooling position (solid line position in FIG. 1) of the air mix door 12 as 0%, and by setting the maximum heating position (chain line position in FIG. 1) of the air mix door 12 as 100%.

Next, the program advances to step S9, an impression voltage to an electromagnetic clutch of an air conditioning compressor (not illustrated) is determined by comparing the actual evaporator blowout temperature Te detected by the temperature sensor 26 with a target evaporator temperature TEO determined based on the TAO described above or the like, and interruption (ON-OFF) of a compressor is determined. Next, the program advances to a step S10 where a control signal is output to various actuator sections (8, 10, 15, 24, and the like) so that a control state determined by the steps S5–S9 described above is obtained. In a following step S11, the program is on standby during a control period τ, and after determining an elapse of the control period τ, the program returns to the step S2.

Figure 4:
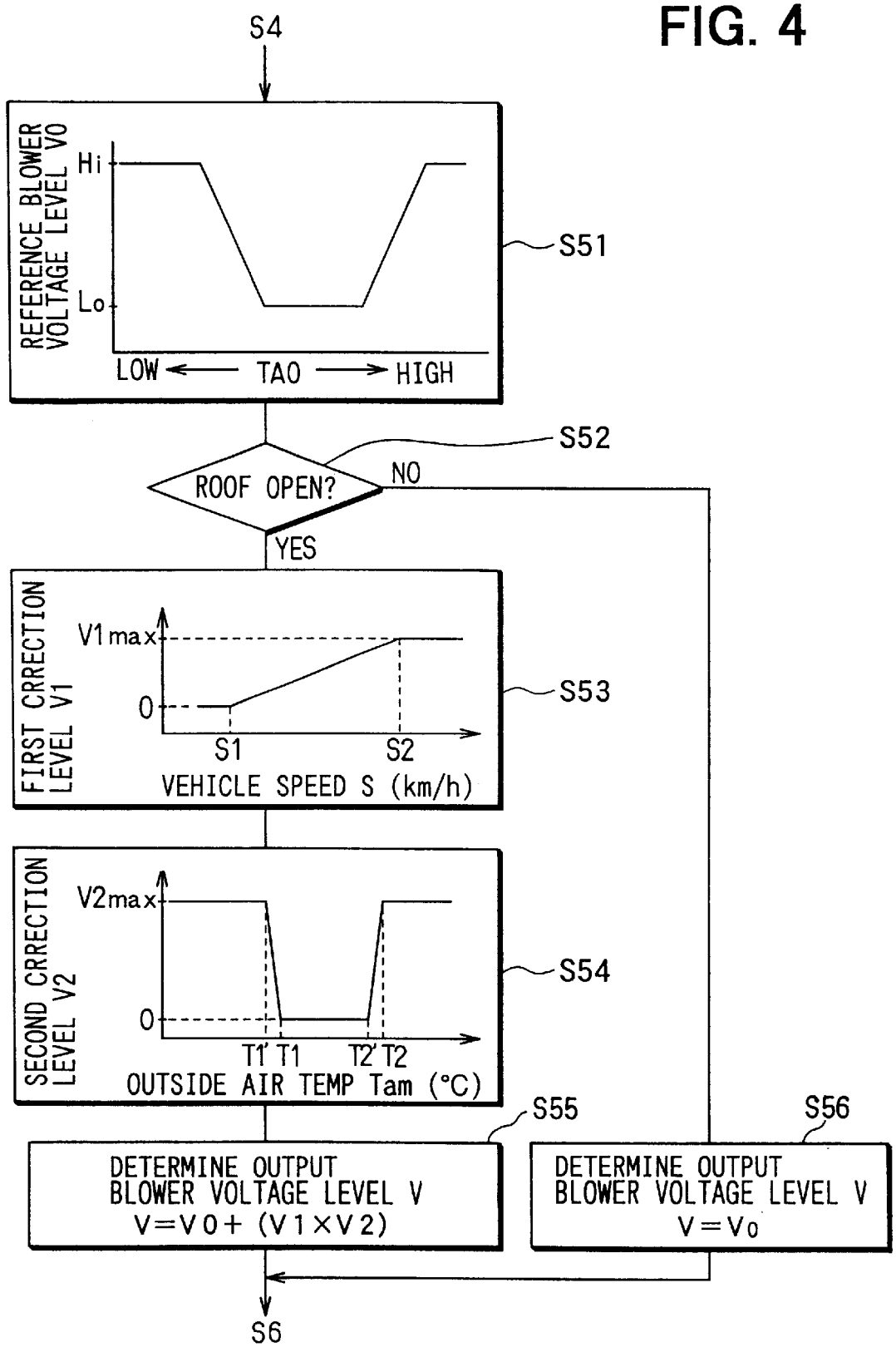
FIG. 4 is a flow chart illustrating a control according to the invention.

FIG. 4 illustrates a specific example of a determining method of a blower voltage according to the step S5. Firstly, in a step S51, a reference blower voltage level (reference air volume) V0 is determined based on the TAO described above. That is, the reference blower voltage level V0 is increased at a high temperature side (maximum heating side) and at a low temperature side (maximum cooling side) of the TAO described above, further, the reference blower voltage level V0 is decreased in an intermediate temperature area of the TAO described above. Here, a rotational speed of the blower driving motor 10, that is, air volume can be adjusted by a blower voltage level being a motor impression voltage. In this embodiment, the reference blower voltage level V0 is designed to be changed at 31 increments according to the TAO between the lowest speed level Lo and the highest speed level Hi.

In a following step S52, whether the roof 40 of a vehicle is open or not is determined based on a roof switch 38 signal. When the roof of a vehicle is open, in a following step S53, a first correction level V1 according to a vehicle speed S is determined. The first correction level V1 is equal to 0 until the vehicle speed S reaches a first prescribed value S1. That is, during low speed traveling, when the vehicle speed S is lower than a first prescribed value S1, (for example lower than 40 km/h), since entrapped air from rearward of a vehicle to forward, originating when the roof (40) is open, is weak, the first correction level V1 due to the vehicle speed is V1=0.

Further, when the vehicle speed S increases from the first prescribed value S1, the first correction level V1 is increased in response to the amount of increase thereof. Here, a second prescribed value S2 of the vehicle speed S is sufficiently higher than the first prescribed value S1, for example, is a speed of 80 km/h. In a speed above a second prescribed value S2, the first correction level V1 is set as the maximum value V1max. The maximum value V1max is set as "1" in the embodiment.

In the meantime, in a step S53, the first prescribed value S1 and the second prescribed value S2 both being a determining value of the vehicle speed S by respectively being provided with an appropriate hysteresis width (for example, degree of 15–20 km/h) at the time of an increase and a decrease of the vehicle speed S, even if there is a slight amount of fluctuation in the vehicle speed S, a frequent fluctuation of the air volume can be prevented.

In the following step S54, a second correction level V2 according to the outside air temperature Tam is determined as follows. In an intermediate season such as spring or autumn, even if the vehicle roof is open, and a turbulent airflow is entrapped from rearward to frontward, since a temperature of entrapped air is not too cold for an occupant, the correction of the air volume according to the vehicle speed S is unnecessary.

Thus, in the embodiment, the second correction level V2 is set to V2=0 between a first prescribed temperature T1 of the outside air temperature lower limit range during spring or fall and a second prescribed temperature T2 of the outside air temperature range upper limit during spring or fall. Here, T1 is set, for example, at a temperature of 22° C., and T2 is set at a temperature of 27° C.

Further, during low outside air temperature (Tam<T1) in which the outside air temperature Tam is lower than T1 and during high outside air temperature (Tam>T2) in which the outside air temperature Tam is higher than T2, the second correction level V2 is set per the map in step S54. That is, the second correction level V2 is increased from 0 to the maximum value V2max by lowering the outside air temperature Tam from T1 toward T1' (for example, 20° C.), and further by increasing the outside air temperature Tam from T2 toward T2' (for example, 30° C.). Here, the maximum value V2max is, for example, "7". In following step S55, an output blower voltage level V is determined by following equation 3 based on the reference blower voltage level V0, the first correction level V1, and the second correction level V2.

$$V=V0+(V1\times V2) \quad \text{[Equation 3]}$$

That is, a blower voltage correction amount is determined by multiplying the first correction level V1 and the second correction level V2, and an output blower voltage level V is finally calculated by adding the blower voltage correction amount and the reference blower voltage level V0. Therefore, according to the embodiment, since V2=0 in the outside air temperature range (in range of T-T2), in spring or fall, a blower voltage correction amount level becomes 0 even when the roof (40) is open. The rotational speed of the blower driving motor 10, that is, the air volume becomes a value determined by the reference blower voltage level V0.

On the other hand, during low outside air temperature (Tam<T1) and high outside air temperature (Tam>T2), the higher the vehicle speed the more increased the blower voltage correction amount. In this way, during low and high outside air temperatures, the roof 40 is open, even if the airflow (turbulent flow) entrapped from rearward to frontward in the vehicle, blowout air volume of air conditioning air (hot or cold air) can be increased in response to vehicle speed. By increasing the blowout air volume in response to vehicle speed, the influence of entrapped air is reduced.

In the meantime, when the roof 40 is closed, the program advances from step 52 to step 56 by making the output blower voltage level V=the reference blower voltage level V0. And, the blower driving motor 10 operates with the reference blower voltage level V0 calculated based on the TAO.

Other Embodiments

In the embodiment described above, in a step 55 illustrated in FIG. 4, a blower voltage correcting amount is found by multiplying a first correction level V1 and a second correction level V2. An output blower voltage level V is calculated by adding the blower voltage correction amount and a reference blower voltage level V0. However, a vehicle speed correction coefficient α is calculated in a step 53, further, an outside air temperature correction coefficient β is respectively calculated in a step 54, a final correction coefficient k is found based on the vehicle speed correction coefficient α and the outside air temperature correction coefficient β. And, an output blower voltage level V may well be determined by multiplying the final correction coefficient k and the reference blower voltage V0.

While the above-described embodiments refer to examples of usage of the present invention, it is understood that the present invention may be applied to other usage, modifications and variations of the same, and is not limited to the disclosure provided herein.

What is claimed is:

1. An air conditioning system mounted on a vehicle having a roof that can be opened and closed, the air conditioning system comprising:

means for blowing air into a vehicle compartment;

means for exchanging heat with the air blowing from the blowing means;

means for determining an open or closed state of the roof;

means for increasing the volume of air blowing from the blowing means in response to an increase in vehicle speed when the roof is in the open state;

means for calculating a target blowout temperature of the air blown into the vehicle compartment;

wherein the means for increasing the air volume of the blowing means includes;

means for determining a reference air volume based on the target blowout temperature; and means for determining a corrected air volume in response to the increase in the vehicle speed.

2. An air conditioning system mounted on a vehicle having a roof that can be opened and closed, the air conditioning system comprising:

means for blowing air into a vehicle compartment;

means for exchanging heat with the air blowing from the blowing means;

means for determining an open or closed state of the roof;

means for increasing the volume of air blowing from the blowing means in response to an increase in vehicle speed when the roof is in the open state; wherein when the roof is open and when an outside air temperature is lower than a first specified temperature or when the outside air temperature is higher than a second specified temperature, the air volume of the blowing means is increased in response to the increase in the vehicle speed.

3. An air conditioned system mounted on a vehicle having a roof that can be opened and closed, the air conditioning system comprising:

means for blowing air into a vehicle compartment;

means for exchanging heat with the air blowing from the blowing means;

means for determining an open or closed state of the roof;

means for controlling the volume of air blowing from the blowing means, wherein when the roof is in the open state and when an outside air temperature is lower than a first specified temperature or when the outside air temperature is higher than a second specified temperature, the air volume of the blowing means is increased.

* * * * *